(12) United States Patent
Deshmukh et al.

(10) Patent No.: US 8,234,468 B1
(45) Date of Patent: Jul. 31, 2012

(54) SYSTEM AND METHOD FOR PROVIDING VARIABLE LENGTH DEDUPLICATION ON A FIXED BLOCK FILE SYSTEM

(75) Inventors: Vijay Deshmukh, Fremont, CA (US); Paul Yuedong Mu, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 352 days.

(21) Appl. No.: 12/432,537

(22) Filed: Apr. 29, 2009

(51) Int. Cl.
*G06F 12/16* (2006.01)
(52) U.S. Cl. .................................. 711/162; 711/E12.103
(58) Field of Classification Search .................. None
See application file for complete search history.

(56) References Cited

U.S. PATENT DOCUMENTS

| 7,472,242 | B1 * | 12/2008 | Deshmukh et al. | ............ | 711/162 |
| 2007/0255758 | A1 * | 11/2007 | Zheng et al. | .................. | 707/200 |
| 2008/0005141 | A1 | 1/2008 | Zheng et al. | | |
| 2008/0294696 | A1 * | 11/2008 | Frandzel | ........................ | 707/200 |

FOREIGN PATENT DOCUMENTS

WO   WO 2008/005211 A2   1/2008

OTHER PUBLICATIONS

Broder, Andrei and Mitzenmacher, Michael, "Network Applications of Bloom Filters: A Survey", Internet Mathematics, May 10, 2004, vol. 1, No. 4: pp. 485-509 (25 pages).
Broder, Andrei and Mitzenmacher, Michael, "Network Applications of Bloom Filters: A Survey", 11 pages.
Cameron, Pete, "Dedupe on Filers: The Good, The Bad and The (not very) Ugly", NetApp 2008, pp. 1-50.
Cao, Pei, "Bloom Filters-the math", available at : http://paqes.cs.wisc.edu/~cao/papers/summary-cache/node8.html, Jul. 5, 1998, pp. 1-6.
Ceglowski, Maciej, "Using Bloom Filters", available at: http://www.perl.com/lpt/a/831, Apr. 8, 2004, pp. 1-9.
Chapa, David, "Choosing the Right Backup Technology", NetApp Tech OnTap 2008, 4 pages.
Chapman, Darrin, "Tackle the Top Three VMWare Backup Challenges", NetApp Tech OnTap 2008, 4 pages.
Dharmapurikar, Sarang, Krishnamurthy Praveen, and Taylor, David E., "Longest Prefix Matching using Bloom Filters," SIGCOMM'03, Aug. 25-29, 2003, Karlsruhe Germany, ACM, 12 pages.
Dillinger, Peter C. and Panagiotis, Manolios, "Bloom Filters in Probabilistic Verification" , Georgia Institute of Technology College of Computing, CERCS, pp. 1-15.

(Continued)

*Primary Examiner* — Denise Tran
(74) *Attorney, Agent, or Firm* — Brinks Hofer Gilson & Lione

(57) ABSTRACT

A system and method are described for providing variable length deduplication on a fixed block file system. In one embodiment, data comprising a plurality of data items is received. A determination is made if a segment of the data items exists on a storage volume. If the segment of data items does not exist on the storage volume, the segment of data items is stored on the storage volume. If the segment of data items exists on the storage volume, the segment of data items is deduplicated with the storage volume. A logical identifier describing a location of the segment in the data stream and a physical identifier describing a physical location of the segment are determined. The logical identifier, the physical identifier and the length of the segment is stored in a data structure such that the segment of data items can be accessed using the logical identifier.

31 Claims, 9 Drawing Sheets

OTHER PUBLICATIONS

Dillinger, Peter C. and Manolios, Panagiotis, "Fast and Accurate Bitstate Verification for SPIN", Georgia Institute of Technology College of Computing, CERCS, pp. 1-19.

Duxbury, Bryan, "Engineering Rapleaf-Bloom Filters", available at: http://blog.rapleaf.com/dev/?p=6, pp. 1-2.

Freeman, Larry, "How Safe is Deduplication?", NetApp Tech OnTap 2008, 2 pages.

Gregorio, Joe, "BitWorking—Bloom Filter Resources", available at: http://bitworking.org/news/380/bloom-filter-resources, Oct. 19, 2008, pp. 1-6.

Jaspreet, "Understanding Data Deduplication", available at: http://blog.druva.com/2009/01/09/understanding-data-deduplication, Jan. 9, 2009, pp. 1-10.

Lewis, Blake, "Deduplication Comes of Age", available at: http://www.netapp.com/us/communities/tech-ontap/dedupe-0708.html, downloaded on Mar. 18, 2009, pp. 1-3.

Osuna, Alex, "IBM System Storage N series A-SIS Deduplication", Redbooks, created or updated on Mar. 13, 2009, pp. 1-76.

Osuma, Alex, IBM System Storage N series A-SIS Deduplication Deployment and Implementation Guide, Redpaper, 2007, pp. 1-30.

Ripeanu, Matei and Iamnitchi, Adriana, "Bloom Filters—Short Tutorial", pp. 1-4.

Singh, Jaspreet, "Data Deduplication—A Detailed Overview", Artipot, available at: http://www.artipot.com/articles/266989/data-deduplication-a-detailed-overview.htm, Jan. 14, 2009, 3 pages.

"Bit Array", Wikipedia, available at: http://en.wikipedia.org/wiki/Bit_array, last modified on Mar. 14, 2009, pp. 1-6.

"Bloom filter", Wikipedia, available at: http://en.wikipedia.org/wiki/Bloom_filter, last modified on Mar. 18, 2009, pp. 1-11.

"Bloom Filters", (powerpoint presentation), available at: http://www.cs.tau.ac.il/~hanoch/Courses/DS/DS-bloom-filter%5B1%5D.ppt, downloaded on Mar. 19, 2009, pp. 1-15.

"Deduplication Frequently Asked Questions", datadomain, available at: http://datadomain.com/resources/faq.html, copyright 2003-2009, downloaded on Feb. 19, 2009, pp. 1-14.

"Hash function", Wikipedia, available at: http://en.wikipedia.org/wiki/Hash_function, last modified on Mar. 14, 2009, pp. 1-9.

"Hash Table with Preemptive Bloom Filter", My Biased Coin, available at: http://mybiasedcoin.blogspot.com/2009/02/hash-table-with-preemptive-bloom-filter.html; Feb. 27, 2009, pp. 1-4.

"Introduction and Overview of Deduplication", NetApp Deduplication for FAS and V-Series Deployment and Implementation Guide, pp. 4-6 (3 pages).

"NetApp Deduplication for FAS Deployoment and Implementation Guide", NetApp Technical Report TR-3505, Sep. 2008, pp. 1-40.

"Scalable Datasets: Bloom Filters in Ruby", igvita.com, available at: http://www.igvita.com/2008/12/27/scalable-datasets-bloom-filters-in-ruby/, Dec. 27, 2008. pp. 1-7.

"Tech OnTap Special Edition: Backup and Recovery", NetApp Tech OnTap 2008, 1 page.

"Technical Overview of NetApp SnapDrive," Network Appliance, Inc., TR-3197, Apr. 2007, pp. 1-12.

"IBM System Storage N series Storage Optimization", IBM Corporation, Aug. 28, 2007, pp. 1-22.

\* cited by examiner

SYSTEM AND METHOD FOR PROVIDING VARIABLE LENGTH DEDUPLICATION ON A FIXED BLOCK FILE SYSTEM

BACKGROUND

A data block may refer to a sequence of bytes having a nominal length, referred to as the block size, which is stored on a storage volume. A file system may continually read and write data blocks to the storage volume. A file system may often require that the block size of each data block be a fixed size, such as 4 kilobytes (KB). The continual reading and writing of the data blocks may cause the storage volume to accumulate duplicate data blocks. The duplicate data blocks may be eliminated from the storage volume through a process referred to as deduplication. A storage volume may only require one instance of a data block to be stored on the physical storage drive; additional instances of the data block may be replaced with a pointer to the original data block. By eliminating duplicate data blocks, and referencing the original data block, immediate benefits may be obtained through storage space efficiencies.

In one example, a backup operation may be performed on a dataset on a periodic basis, such as on a daily basis. The dataset may store data in fixed size data blocks, such as 4 KB. The dataset may not change significantly between each backup operation and therefore each backup may include a large amount of duplicate data. Significant storage space efficiencies may be obtained by eliminating the duplicate data from each backup. However, if the dataset is slightly modified, e.g. data is inserted in the middle of the dataset, the data contained within each data block of the dataset may be modified, or shifted. Since the data contained within each data block has been modified, the modified data blocks may no longer be duplicates of stored data blocks, and may not be able to be deduplicated. Thus, although the dataset includes a significant amount of duplicate data, a deduplication operation may not be able to effectively deduplicate the dataset.

Since the dataset contains a large amount of duplicate data, it may also be desirable to identify and eliminate the duplicate data in real-time as the data is received, such that the duplicate data may not be written to the storage volume. The process of deduplicating a dataset in real-time may be referred to as inline deduplication, whereas the process of writing a dataset to a storage volume and then deduplicating the dataset may be referred to as post-processing deduplication. In an inline deduplication, a backup operation may communicate a dataset through a data stream to a deduplication operation. The deduplication operation may deduplicate the data stream as it is received and write any new data to the storage volume. In order to compare the incoming data stream to stored data blocks, the deduplication operation may split the data stream into segments which are of equal length as the stored data blocks. For example, if the stored data blocks are a fixed size, such as 4 KB, the data stream may be split into 4 KB segments in order to be deduplicated. However, the deduplication operation may not be able to account for small shifts in the data stream if the data stream is split into fixed length segments. Thus, the inline deduplication may fail to effectively deduplicate the data when there are shifts in the data stream, and in turn the inline deduplication operation may fail to prevent duplicate data from being written to the storage volume. Thus, there may be a need for a more effective operation for deduplicating data on a fixed block size file system.

DETAILED DESCRIPTION

Figure 1:
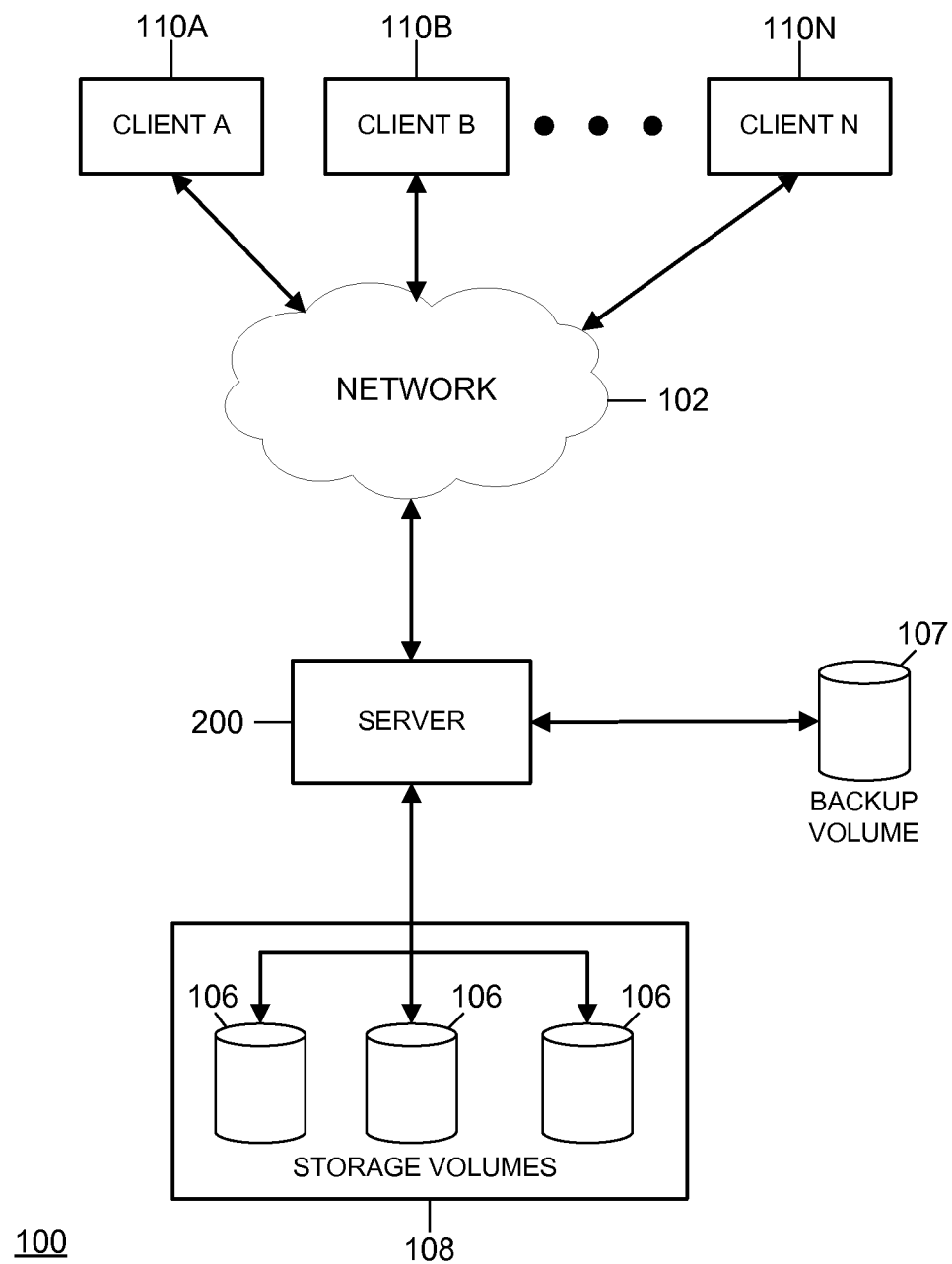
FIG. 1 is a block diagram of an exemplary network environment of an embodiment.

In these embodiments, a system is presented for providing variable length deduplication on a fixed block file system, which provides an advantage over the prior systems by allowing a deduplication operation to account for slight data modifications, or shifts, in a dataset. The deduplication operation can account for shifts in a dataset by splitting one or more fixed block size data blocks being deduplicated, or a received data stream being deduplicated, into variable length segments. The variable length segments can be smaller than an individual data block and can therefore account for a small insertion into, or shift of, the dataset. Accounting for shifts in the dataset allows an inline or post-processing deduplication operation to correctly identify and deduplicate duplicate data in the dataset, even if the data blocks in the dataset are not duplicates of stored data blocks. Providing an effective deduplication of datasets with large amounts of duplicate data allows significant storage space efficiencies to be realized.

The system in these embodiments enables effective deduplication of a fixed block size dataset, irrespective of the amount of new data in the data stream. The data stream may include multiple data items which may collectively be a backup of a dataset. The dataset may be backed up on a periodic basis, such as on a daily basis. The system may analyze the data items as they are received to determine whether a segment of the data items is a duplicate of data blocks stored on the storage volume. The system may analyze varying lengths of segments in order to identify data items which identically match one or more entire data blocks on the storage volume. If the system is unable to identify a duplicate segment of data items, the system writes the analyzed data items to the storage volume as new data. If the system identifies a duplicate segment of data items, the system deduplicates the duplicate data items. After writing or deduplicating the data items, the system stores data describing the location of the segment of data items in the dataset, data describing the physical location of the segment of data items on the storage volume, and the length of the segment of data items.

After performing the inline deduplication, the system may receive a request to read data items from the storage volume. The read request may include data describing the location of the data in the original dataset, such as a logical offset. The system may use the logical offset to retrieve data describing the physical location of the data items on the storage volume. The physical location of the data items on the storage volume may be used to retrieve the data items from the storage volume. The system may provide the data items in response to the read request.

Other systems, methods, features and advantages may be, or may become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Turning now to the drawings, FIG. 1 provides a general overview of an exemplary network environment 100 implementing an embodiment for coordinating deduplication operations and backup operations of a storage volume. Not all of the depicted components may be required, however, and some implementations may include additional components. Variations in the arrangement and type of the components may be made without departing from the spirit or scope of the claims as set forth herein. Additional, different or fewer components may be provided.

Network 102 can be a local area network (LAN), a wide area network (WAN), virtual private network (VPN) utilizing communication links over the internet, for example, or a combination of LAN, WAN, and VPN implementations. For the purposes of this description, the term network should be taken broadly to include any acceptable network architecture. The network 102 interconnects various clients 110A-N. Also attached to the network 102 is a server 200. The server 200, which is described in more detail in FIG. 2 below, is configured to control storage of, and access to, data and an array of disks 108 which include the storage volumes 106. The server 200 may also provide operations related to the storage volumes 106, such as backup operations and deduplication operations. A storage volume 106 may be single accessible storage area with a single file system, such as an accessible storage area on a hard disk, an optical disc, a tape drive, or generally any storage medium. The file system may be a fixed block length file system or a variable block length file system. The server 200 may also control storage of, and access to, one or more backup volumes 107. The backup volume 107 may store a point in time image, also known as a backup dataset, of one of the storage volumes 106. The server 200, the storage volumes 106, and the backup volume 107 may be connected to a common communication and data transfer infrastructure, such as Fibre Channel, and may collectively comprise a storage area network (SAN).

Each of the devices attached to the network 102 includes an appropriate network interface arrangement (not shown) for communicating over the network using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

The server 200 may be an example of a computer that uses a deduplication engine to eliminate duplicate data stored on the storage volumes 106. The deduplication engine may be provided by NetApp, Inc.'s Data ONTAP™ operating system and is discussed in more detail in FIG. 3 below. The deduplication engine may eliminate duplicate data blocks by replacing the duplicate data blocks with a pointer to the original data block. For example, an email system may contain twenty instances of the same one megabyte file attachment, requiring twenty megabytes of physical storage space. However, if the storage volume of the email system is deduplicated, only one instance of the email attachment is stored; each subsequent instance is referenced back to the original instance. Thus, through deduplication, the twenty megabytes of storage originally allocated to the email attachments can be reduced to only one megabyte of storage. The deduplication engine may perform deduplication operations on the storage volumes 106 and the backup volume 107 at periodic intervals, such as on a daily basis.

The server 200 may utilize a backup engine to perform data protection and other tasks such as data mining and data cloning on the storage volumes 106. The backup engine also may be provided by NetApp, Inc.'s Data ONTAP™ operating system and is discussed in more detail in FIG. 3 below. The backup engine may be used to perform a snapshot operation on a storage volume 106. The snapshot operation may create a point-in-time image of a storage volume 106, referred to as a snapshot of the storage volume 106. The snapshot data is often read-only, such that the snapshot data can not be modified. The snapshot data may include files, directories and/or entire storage volumes and may be stored in the backup volume 107. The backup engine may also be used to perform a backup operation on the storage volumes 106. The backup operation may copy all of the data stored on a storage volume 106 to the backup volume 107.

The backup engine may be configured to create snapshots and/or backups of a storage volume 106 at periodic intervals, such as every hour, which may be stored in the backup volume 107. If the storage volume 106 is backed up on a regular basis, each sequential backup may not differ significantly from the previous backup. In this instance, removing duplicate data from a backup dataset may significantly reduce the storage space required for the backup dataset on the backup volume 107. The deduplication engine 120 may deduplicate a backup dataset after a backup operation has completed and after the backup dataset has been written to the backup volume 107, which may be referred to as post-processing deduplication. Alternatively the deduplication engine may perform a real time, or inline deduplication, of the backup dataset. An inline deduplication can deduplicate the data items in a backup data stream before writing the data items to the backup volume 107, which can result in significant space savings. In an inline deduplication, the deduplication engine may identify a segment of data received from a backup data stream which is a duplicate of one or more stored data blocks before writing the segment of data to the backup volume 107. The inline deduplication may then deduplicate the segment of data, thereby preventing the segment of data from ever being written to the backup volume 107.

A deduplication operation can compare variable length segments of a dataset to be deduplicated to stored data blocks, such as data blocks on the backup volume 107. The segment length refers to the size of data being compared against stored data blocks to identify duplicate data blocks. In a deduplication using fixed segment lengths, each segment of the dataset being deduplicated is the same fixed size. The fixed size may match the size of the stored data blocks the dataset is being deduplicated against. For example, if the data blocks stored on the backup volume 107 are 4 KB, then each fixed length segment being deduplicated may be 4 KB.

A deduplication using fixed segment lengths may be efficient when the dataset being deduplicated and the stored data blocks are largely the same, as most of the fixed length segments may be identical to the stored data blocks. However, if new data has been inserted into the backup dataset being deduplicated, there may be very few fixed length segments which are identical to data blocks on the backup volume 107, causing the deduplication to be highly ineffective. For example, if a small number of bytes are inserted into the middle of a dataset, the subsequent bytes may be shifted to incorporate the new bytes. Thus, when the data stream is split into fixed length segments, the segments containing shifted data may not identically match one or more entire data blocks on the storage volume 106. Splitting a data stream into fixed length segments is discussed in more detail in FIG. 4 below.

In a variable length deduplication, a data stream of a dataset being deduplicated may be divided into segments of varying lengths. This allows the boundaries of the segments to be adjusted such that an insertion into the middle of the dataset may not prevent the remainder of the dataset from being deduplicated. Splitting a data stream into variable length segments is discussed in more detail in FIG. 5 below. For example, the deduplication engine may determine the start of a segment of data items such that the start of the segment is aligned with the boundary, or start, of a stored data block on the backup volume 107. Once the segment of data items is aligned with the boundary of a data block on the backup volume 107, the segment can be rapidly deduplicated against the data blocks stored on the backup volume 107, particularly in cases where the data has not changed significantly since the last backup operation. The steps of performing a variable length deduplication are discussed in more detail in FIG. 6 below.

Figure 2:
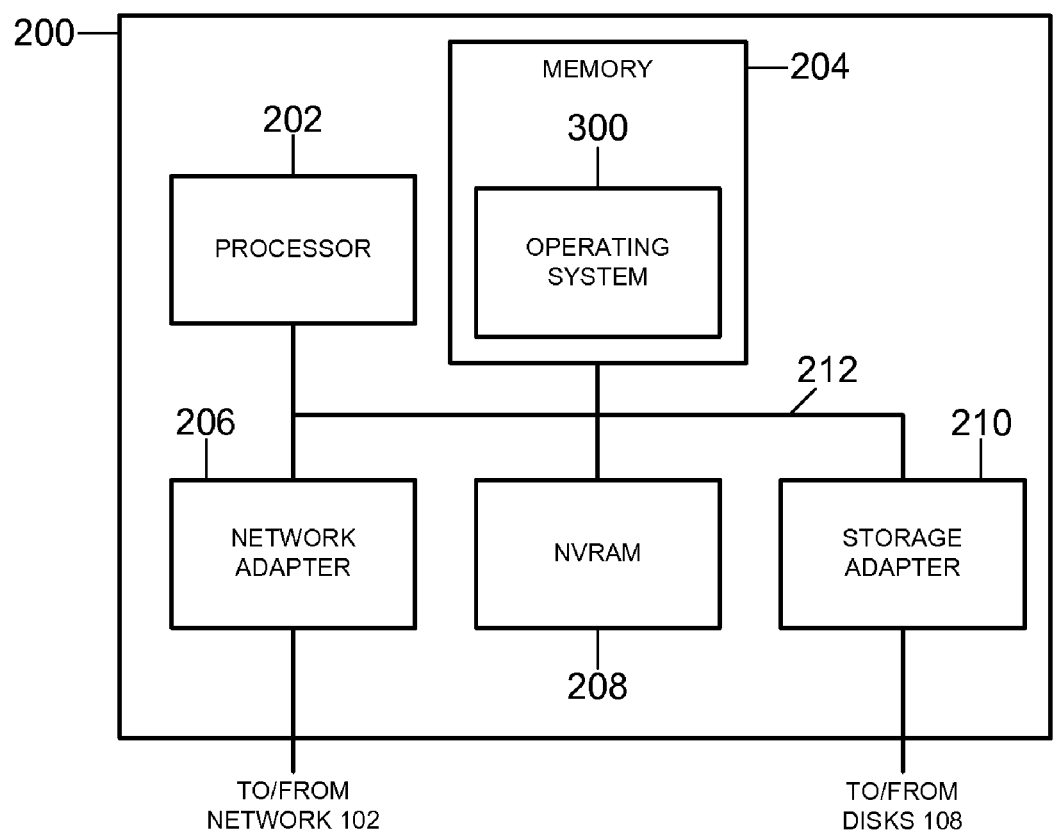
FIG. 2 is a block diagram of an exemplary server of an embodiment.

FIG. 2 is a block diagram of an exemplary server 200 in the network environment 100 of FIG. 1. The server 200 may be a computer that provides file and/or block based services relating to the organization of information on storage devices, such as disks. The server 200 may provide information stored on the storage devices in response to file access requests and/or block based access requests. The embodiments described herein can apply to any type of server 200, whether implemented as a special-purpose or general-purpose computer, including a standalone computer. The server 200 comprises a processor 202, a memory 204, a network adapter 206, a nonvolatile random access memory (NVRAM) 208, and a storage adapter 210 interconnected by system bus 212. Contained within the memory 204 is an operating system 300 that implements a file system to logically organize the information as a hierarchical structure of directories and files on the disks. The memory 204 includes storage locations that are addressable by the processor 202 and adapters for storing software program code. Portions of the operating system 300 are resident in memory 204 and executed by the processor 202. The operating system 300 functionally organizes the server 200 by, inter alia, invoking storage operations in support of a file service implemented by the server 200.

The network adapter 206 comprises the mechanical, electrical and signaling circuitry needed to connect the server 200 to clients 110A-N over network 102 (FIG. 1). Clients 110A-N maybe general-purpose computers configured to execute applications, such as data base applications. Moreover, clients 110A-N may interact with the server 200 in accordance with the client/server model of information delivery. That is, clients 110A-N may request the services of the server 200, and the server 200 may return the results of the services requested by clients 110A-N, by exchanging packets defined by an appropriate networking protocol.

The storage adapter 210 incorporates with the operating system 300 executing on the server 200 to access information requested by the clients 110A-N. Information may be stored on the array of disks 108 (FIG. 1) which may be attached via the storage adapter 210 to the server 200. The storage adapter 210 includes input/output (I/O) interface circuitry that couples to the array of disks 108 over an I/O interconnect arrangement, such as a high-performance Fibre Channel serial link topology. The information is retrieved by the storage adapter 210 and, if necessary, processed by the processor 202 (or the adapter 210 itself) prior to being forwarded over the system bus 212 to the network adapter 206, where information is formatted into appropriate packets and returned to the clients 110A-N.

In one exemplary server implementation, the server 200 can include a non-volatile random access memory (NVRAM) 208 that provides fault-tolerant backup of data, enabling the integrity of server transactions to survive a service interruption based upon a power failure or other fault.

One type of file system that may be configured to operate on the server 200 is a "write in-place" file system, an example of which is the Berkeley Software Distribution (BSD™) Fast File System. In a write in-place file system, the locations of the data structures, such as inodes and data blocks, on disk may be fixed. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated, and the appropriate inode is updated to reference that data block.

Another type of file system that may be configured to operate on the server 200 is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on the server 200 is the Write Anywhere File Layout (WAFL™) file system available from NetApp, Inc. of Sunnyvale, Calif. The WAFL file system is implemented within a microkernel as part of the overall protocol stack of the server 200 and associated disk storage. This microkernel is supplied as part of NetApp, Inc.'s Data ONTAP™ operating system, residing on the server 200, which processes file-service requests from network-attached clients.

Figure 3:
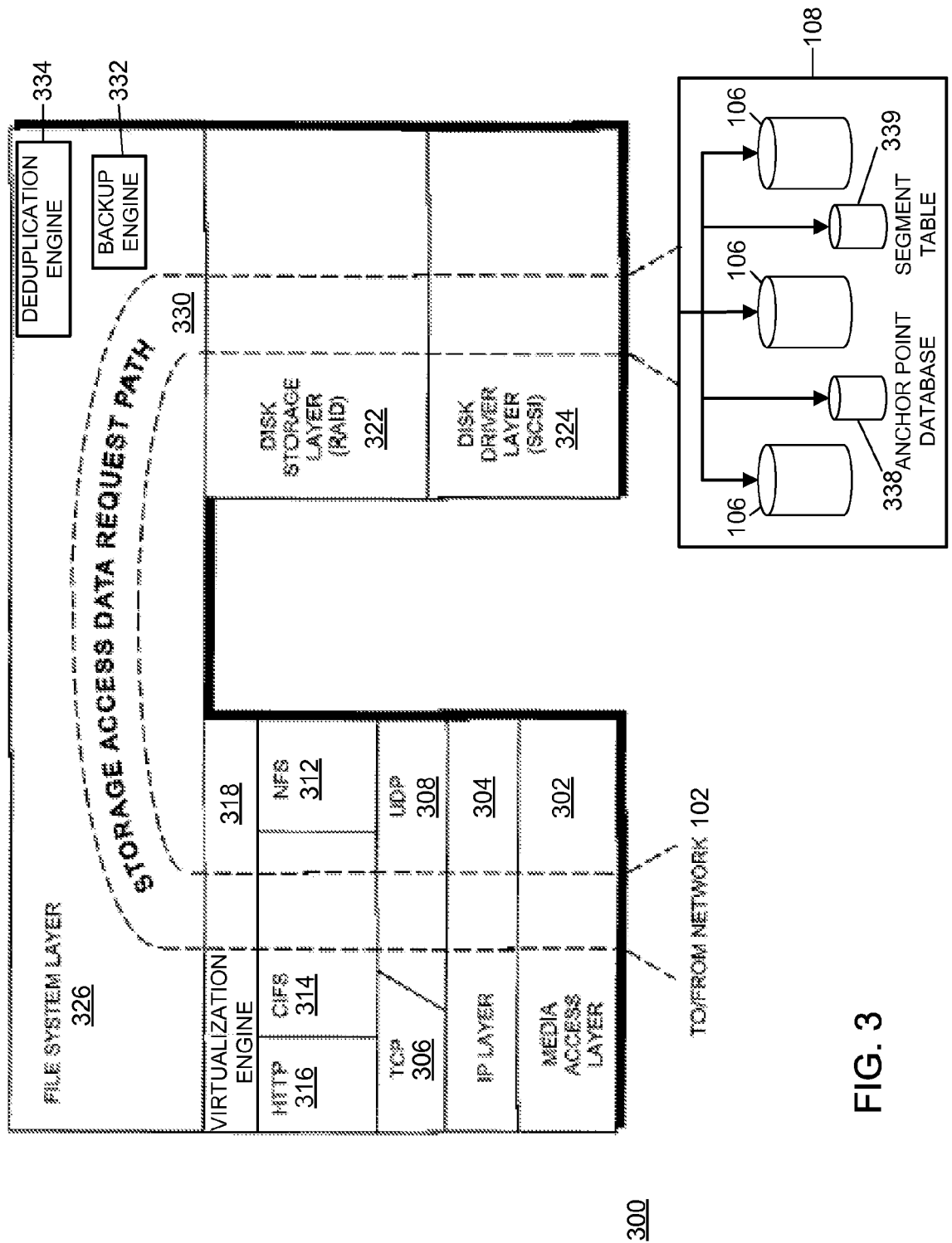
FIG. 3 is a block diagram of an exemplary operating system implemented by the server of FIG. 2.

FIG. 3 is a block diagram of an exemplary operating system 300 implemented by the server 200 of FIG. 2. Not all of the depicted components may be required, however, and some implementations may include additional components. Variations in the arrangement and type of the components may be made without departing from the spirit or scope of the claims as set forth herein. Additional, different, or fewer components may be provided.

The operating system 300, such as NetApp, Inc.'s Data ONTAP™ operating system, includes a series of software layers, such as a media access layer 302 of network drivers (e.g., an Ethernet driver). The operating system 300 further includes network protocol layers, such as an Internet Protocol (IP) layer 304 and its supporting transport mechanisms, the Transport Control Protocol (TCP) layer 306 and the User Datagram Protocol (UDP) layer 308, and a virtualization engine 318.

A file system protocol layer provides multi-protocol data access and includes support for the Network File System (NFS) protocol 312, the Common Internet File System (CIFS) protocol 314 and the Hyper Text Transfer Protocol (HTTP) 316. In addition, the operating system 300 includes a disk storage layer 322 that implements a disk storage protocol, such as a RAID protocol, and a disk driver layer 324 that implements a disk access protocol such as a Small Computer System Interface (SCSI) protocol.

The virtualization engine 318 acts as an intermediary between the file system protocol layer 326 and the disk storage layer 322. The virtualization engine 318 may utilize a segment table 339 to lookup a mapping between the logical file offset seen by the clients 110A-N, and the physical file offset as stored on the storage volumes 106 or backup volume 107. The segment table 339 may be created by the deduplication engine 332 when a storage volume 106 is first deduplicated and may be stored on the storage volume 106. Alternatively, the segment table 339 may be stored on the array of disks 108, outside of the storage volume 106, or the segment table 339 may be stored in memory 204. The deduplication engine 332 may create a segment table 339 for each storage volume 106 which is deduplicated. Alternatively, the deduplication engine 332 may create a segment table 339 for each file of each storage volume 106 which is deduplicated. In this instance a segment table 339 may be associated with each file as a file attribute.

The virtualization engine 318 may receive read requests from the clients 110A-N. The read requested may include a logical offset and length of requested data. The virtualization engine 318 may use the segment table 339 to map the logical offset requested by the clients 110A-N to the physical offset of the data blocks on the storage volumes 106 or the backup volume 107. Mapping the logical offset accessed by the clients 110A-N to the physical offset on the storage volumes 106 or backup volume 107 may be referred to as file offset virtualization.

A file system layer 326 bridges the disk software layers with the network and file system protocol layers. The file system layer 326 may often implement a file system having an on-disk format representation that is block-based using, e.g., 4-kilobyte (KB) data blocks and using inodes to describe the files. The file system may be a fixed block size file system or a variable block size file system. In a fixed block size file system, the data blocks may be a fixed size, or length, such that every data block is the same size. For example, if a fixed block size file system uses 4 KB data blocks, every data block in the file system may be 4 KB in size. In a variable block size file system, the data blocks may be of varying sizes. For example, if a data block in a variable block size file system is 32 KB, but only contains 4 KB of data, the data block can be compressed to a 4 KB data block to save space on the storage volume 106.

In response to transaction requests, the file system 326 generates operations to load (retrieve) the requested data from storage volumes 106 if it is not resident "in-core", i.e., in the memory 204 of the server 200. If the information is not in memory 204, the file system layer 326 indexes into the inode file using the inode number to access an appropriate entry and retrieve a logical volume block number. The file system layer 326 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer 324. The disk driver accesses the disk block number from storage volumes 106 and loads the requested data in memory 204 for processing by the server 200. Thus, the physical offset of the disk may be implemented as a logical block reference. Upon completion of the request, the server 200 (and operating system 300) returns a reply, such as an acknowledgement packet defined by the CIFS specification, to the clients 110A-N over the network 102.

The storage access request data path 330 needed to perform data storage access for the client requests received by the server 200 may alternately be implemented in hardware, software or a combination of hardware and software. That is, in an alternative embodiment, the storage access request data path 326 may be implemented as logic circuitry embodied, for example, within a microprocessor or controller, like a programmable gate array or an application specific integrated circuit (ASIC). A hardware implementation may increase the performance of the file service provided by the server 200 in response to a file system request issued by one of the clients 110A-N.

To facilitate the generalized access to the storage volumes 106, the operating system 300 may implement a write-anywhere file system that logically organizes the information as a hierarchical structure of directories and files on the disks. Each "on-disk" file may be implemented as a set of disk blocks configured to store information, such as data. Each "on-disk" directory may be implemented as a specially formatted file, which stores other files and directories. The operating system 300 can support both file-based access requests and block-based access requests.

The backup engine 332 may control the backup and snapshot operations on the storage volumes 106. In one example, the backup engine 332 may utilize NetApp, Inc.'s Data ONTAP SnapVault™ to provide snapshot operations and backup operations. The snapshot and backup operations may be scheduled to run on a periodic basis. The schedules may be identified by one of the clients 110A-N when the backup or snapshot operations are first configured for a storage volume 106.

The deduplication engine 334 may perform the deduplication operations on the storage volumes 106 and the backup volume 107. In one example, the deduplication engine 334 may utilize NetApp, Inc.'s A-SIS™ (Advanced Single-Instance Storage), part of NetApp, Inc.'s Data ONTAP™ operating system, to provide deduplication operations. Alternatively, the deduplication engine 334 may utilize NetApp, Inc.'s Virtual Tape Library (VTL) to provide the deduplication operations. In one example, the deduplication engine 334 may use an anchor point database 338 to store rolling hashes, or "anchor points" of a dataset stored on the storage volume 106, along with data identifying the location of the anchor point in the dataset. The anchor points may be generated using a rolling hash function, such as the Rabin-Karp algorithm, or the Adler-32 checksum. For example, the rolling hash function may use a 64 KB window to generate the anchor points, and the deduplication engine 334 may generate three anchor points for every 64 KB of data. The anchor point database 338 is often stored on the array of disks 108 where the storage volumes 106 are stored. However, the anchor point database 338 may often be stored outside of the storage volumes 106 in order to achieve higher space savings when performing a deduplication operation on the storage volumes 106.

For a storage volume 106 being deduplicated the first time, the deduplication engine 334 may generate anchor points as described above. For each new anchor point, the deduplication engine 334 may determine whether the anchor point was previously stored in the anchor point database 338. If the anchor point was not previously stored in the anchor point database 338, the deduplication engine 334 may store the anchor point along with data identifying the location of the anchor point within the storage volume 106. If the anchor point exists in the anchor point database 338, the deduplication engine 334 may retrieve the stored data blocks corresponding to the anchor point and perform a byte-by-byte comparison, starting with the anchor point, to determine whether any of the data blocks are duplicates. If the byte-by-byte comparison verifies that the data blocks are duplicates, the deduplication engine 334 aligns deduplicates the data blocks. Otherwise the deduplication engine 334 stores the anchor point in the anchor point database 338. Alternatively, the deduplication engine 334 may perform a byte-by-byte comparison forward and backward of the anchor point to determine whether any of the data blocks surrounding the anchor point are duplicates.

The deduplication engine 334 may perform an inline deduplication on a data stream received from a backup operation containing a backup dataset. The deduplication engine 334 may deduplicate the dataset prior to writing the dataset to the backup volume 107. The deduplication engine 334 may generate anchor points for the data stream and may compare the anchor points to the anchor point database 338. If a generated anchor point exists in the anchor point database, the deduplication engine 338 may perform a byte-by-byte comparison forward and backward of the anchor point to identify the start of a matching data block. The deduplication engine 334 may align the first matching block to the data stream and may deduplicate the data stream against the backup volume 107.

The deduplication engine 334 may also generate a data structure, such as a segment table 339, for the dataset. The segment table 339 may store data indicating a mapping of the logical location of the data in the dataset, to the physical location of the data stored on the backup volume 107. The segment table 339 may be a data structure, such as binary tree. The segment table 339 may be used to allow the deduplication operation to account for small insertions into the dataset. For example, new data may be inserted into the dataset which may be smaller than the size of a data block on the fixed block file system. The deduplication engine 334 may write the new data to a data block on the backup volume 107. Although the new data may not fill the entire data block, the deduplication engine 334 may not store any other data in the data block. Thus, the physical offset of the next entry in the segment table 339 is located at the boundary, or start of the next data block. The creation of the segment table 339 is discussed in more detail in FIG. 6 below.

Figure 4:
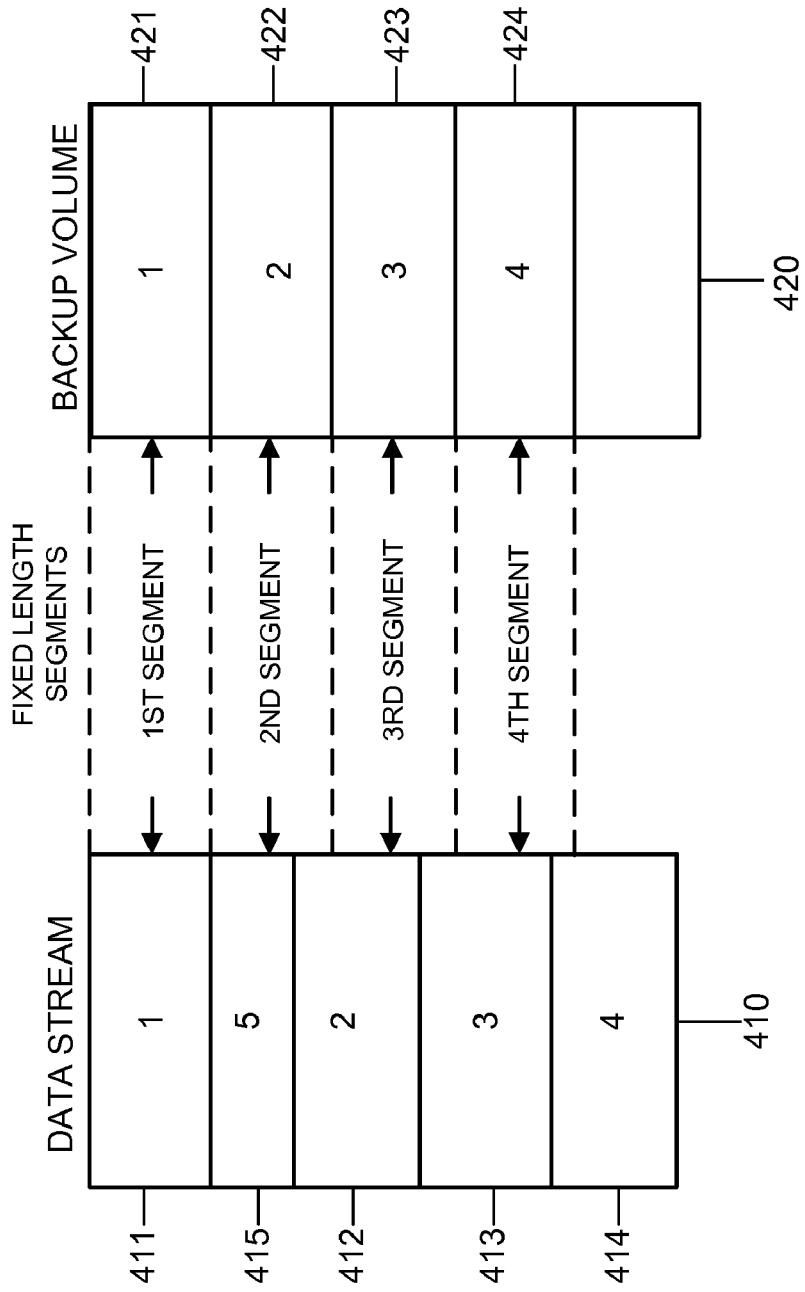
FIG. 4 is a diagram illustrating two exemplary datasets where the datasets are being deduplicated using a fixed length deduplication operation.

FIG. 4 is a diagram illustrating two exemplary datasets where the datasets are being deduplicated using a fixed length deduplication operation. FIG. 4 includes an exemplary data stream dataset 410, and an exemplary backup volume dataset 420. The backup volume dataset 420 may be a dataset stored on the backup volume 107, which was previously backed up from one of the storage volumes 106 as part of a periodic backup operation, and may use fixed length block sizes, such as 4 KB. The data stream dataset 410 may represent a dataset of a current backup of the storage volume 106 being written to the backup volume 107. The deduplication engine 334 may attempt to deduplicate the data stream dataset 410 prior to writing the dataset to the backup volume 107. The data stream dataset 410 may include data item 411, data item 412, data item 413, data item 414, and data segment 415. The storage volume dataset 420 may include data block 421, data block 422, data block 423, and data block 424. The data items 411-414 in the data stream dataset 410 may represent duplicate data as the data stored in data blocks 421-424 in the storage volume dataset 420, while data item 415 may represent new data item inserted into the data stream dataset 410. As FIG. 4 demonstrates, the insertion of data item 415 into the data stream dataset 410 causes the data items 412-414 to shift downstream.

If a deduplication operation using fixed length segments is performed on the datasets 410, 420, the deduplication engine 334 may split the data stream dataset 410 into fixed length segments which are equal to the size of the data blocks on the backup volume 107. The dashed lines in FIG. 4 may represent the fixed length segmentations of the data stream dataset 410. The deduplication engine 334 then attempts to deduplicate the first segment of the data stream dataset 410, which includes the data item 411, against the first data block 421 of the storage volume dataset 420. Since the data item 411 is a duplicate of the data block 421, the deduplication engine 334 identifies the data item 411 of the data stream dataset 410 as a duplicate, and deduplicates the data item 411 against the data block 421.

The deduplication engine 334 may then attempt to deduplicate the second segment of the data stream dataset 410, which includes the data item 415, and half of the data item 412. The deduplication engine 334 may compare the second segment with the data block 422 of the backup volume dataset 420 and determine that the second segment does not match the data block 422 and is therefore new data. Thus, the deduplication engine 334 may write the second segment of the data stream dataset 410 to the backup volume 107, even though the data item 412 is already stored on the backup volume 107 in the data block 422. As shown by the segments in FIG. 4, the deduplication operation may proceed to incorrectly identify each remaining segment of the data stream dataset 410 as new data, because the segments may not exactly match one or more of the data blocks 422-424 of the backup volume dataset 420. Since each segment starts mid-way through the data items 412-414, the deduplication operation may not be able to align data items 412-414 with the data block 422-424 in the data storage dataset 420. Thus, the deduplication engine 334 may unnecessarily write all of the remaining data items to the backup volume 107 as new data. Thus, the insertion of the data item 415 into the data stream dataset 410 prevents a large portion of duplicate data in the data stream dataset 410 from being properly deduplicated.

Figure 5:
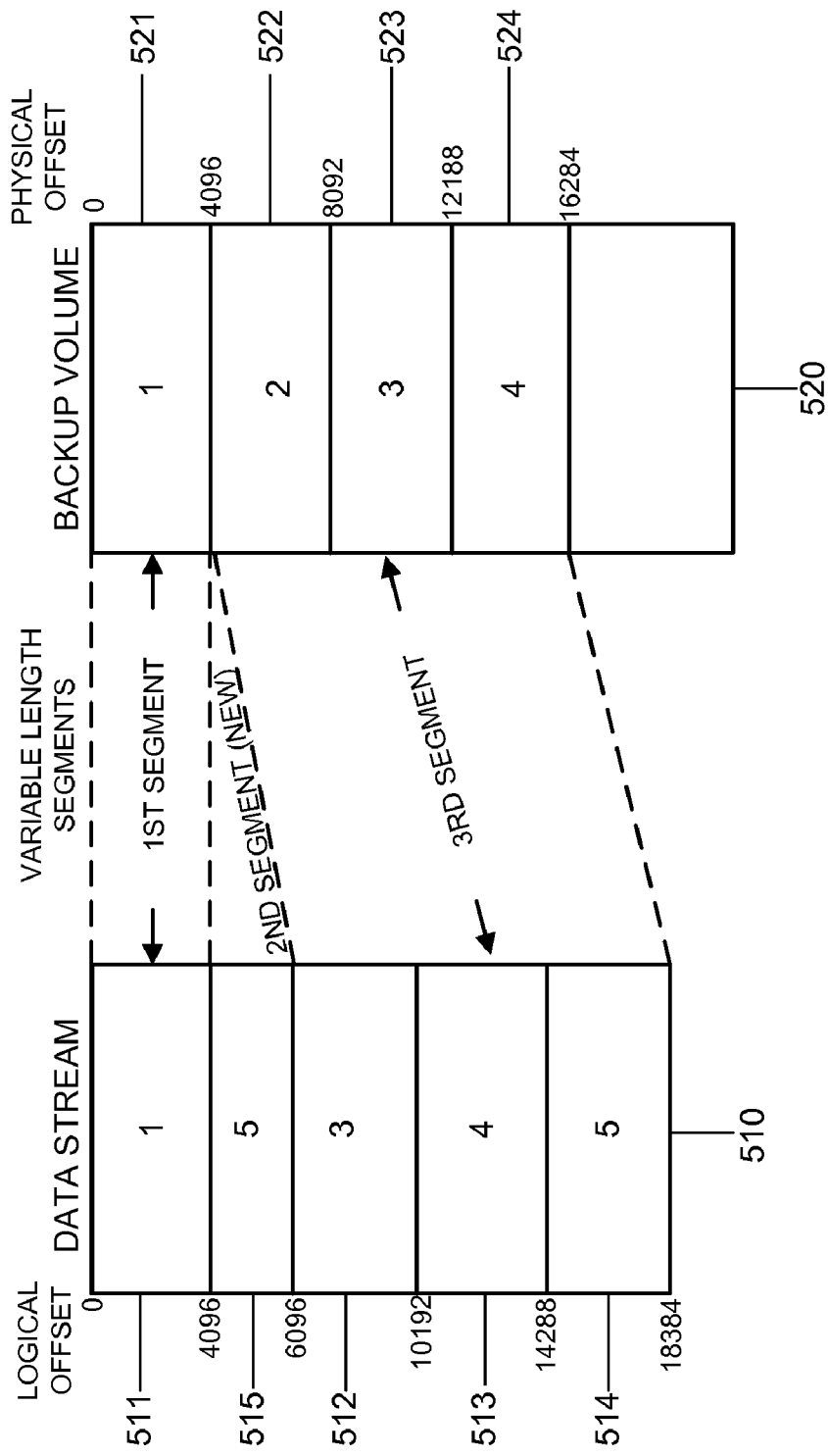
FIG. 5 is a diagram illustrating two exemplary datasets where the datasets are being deduplicated using a variable length deduplication operation.

FIG. 5 is a diagram illustrating two exemplary datasets where the datasets are deduplicated using a variable length deduplication operation. FIG. 5 includes an exemplary data stream dataset 510, and an exemplary backup volume dataset 520. The backup volume dataset 520 may be a dataset stored on the backup volume 107, which was previously backed up from one of the storage volumes 106 as part of a periodic backup operation, and may include fixed length block sizes, such as 4 KB. The data stream dataset 510 may represent a dataset of a current backup of the storage volume 106 being written to the backup volume 107. For example, the deduplication engine 334 may deduplicate the data stream dataset 510 prior to writing the dataset to the backup volume 107. The data stream dataset 510 may include data item 511, data item 512, data item 513, data item 514, and data segment 515. The storage volume dataset 520 may include data block 521, data block 522, data block 523, and data block 524. The data items 511-514 in the data stream dataset 510 may represent duplicate data as the data stored in data blocks 521-524 in the storage volume dataset 520, while data item 515 may represent new data item inserted into the dataset.

In a variable length deduplication operation, the deduplication engine 334 may split the data stream dataset 510 into segments of varying lengths in order to account for varying lengths of data which are new or duplicate. For example, the deduplication engine 334 may identify that the data item 511 matches the data block 521, but that the data item 515 does not match the data item 522. Thus, the deduplication engine 334 may create the first segment as the data item 511. The deduplication engine 334 may deduplicate the first segment and may create a row in the segment table 339 for the first segment. The row may include the start and end of the logical offsets in the data stream dataset 510 of 0 and 4096, and the row may include the start and end of the corresponding physical offsets in the backup volume dataset 520 of 0 and 4096. Alternatively, the segment table 339 may include the starting physical and logical offsets and the length of the segment.

The deduplication engine 334 may then start the second segment with the data item 515, and may include any subsequent new data in the second segment. In this example, the new data is only the data item 515; therefore the second segment only contains the data item 515. Since the data item 515 can not be deduplicated, the data item 515 is written to the backup volume 107k, such as after the data block 524 at the physical offset of 16284 to 18284. The deduplication engine 334 may add a row to the segment table 339 for the second segment. The row may include the start and end of the logical offsets of the segment of 4096 and 6096, and the row may include the start and end of the physical offsets of the segment of 16248 and 18284. Although the data item 515 may not fill an entire data block, the remainder of the data block where the data item 515 is stored is left as empty space. Leaving the remainder of the data block as empty space ensures that additional data written to the backup volume 107 may properly align during future deduplication operations. Thus, the next data item written to the backup volume 107 may start at the physical offset of 20380.

The deduplication engine 334 may start the third segment with the data item 512. The deduplication engine 334 may identify that the data item 512 matches the data block 522. The deduplication engine 334 may align the data item 512 with the data block 522 and may determine the length of the third segment based on the amount of subsequent data in the data stream dataset 510 which matches the backup volume dataset 520. Since the remainder of the data items 512-514 match the data blocks 512-514, the third segment may include the data items 512-514. The deduplication engine 334 may deduplicate the data items 512-514 with the data blocks 522-524 and may add a row to the segment table 339 for the segment. The row may include the start and end logical offsets in the data stream dataset 510 of 6096 and 18384, and the start and end physical offsets of 4096 and 16284. Since the variable segment length deduplication allows flexibility in determining the segment lengths, changes in one part of the data stream dataset 510 does not prevent other parts of the data stream dataset 510 from being deduplicated.

Figure 6:
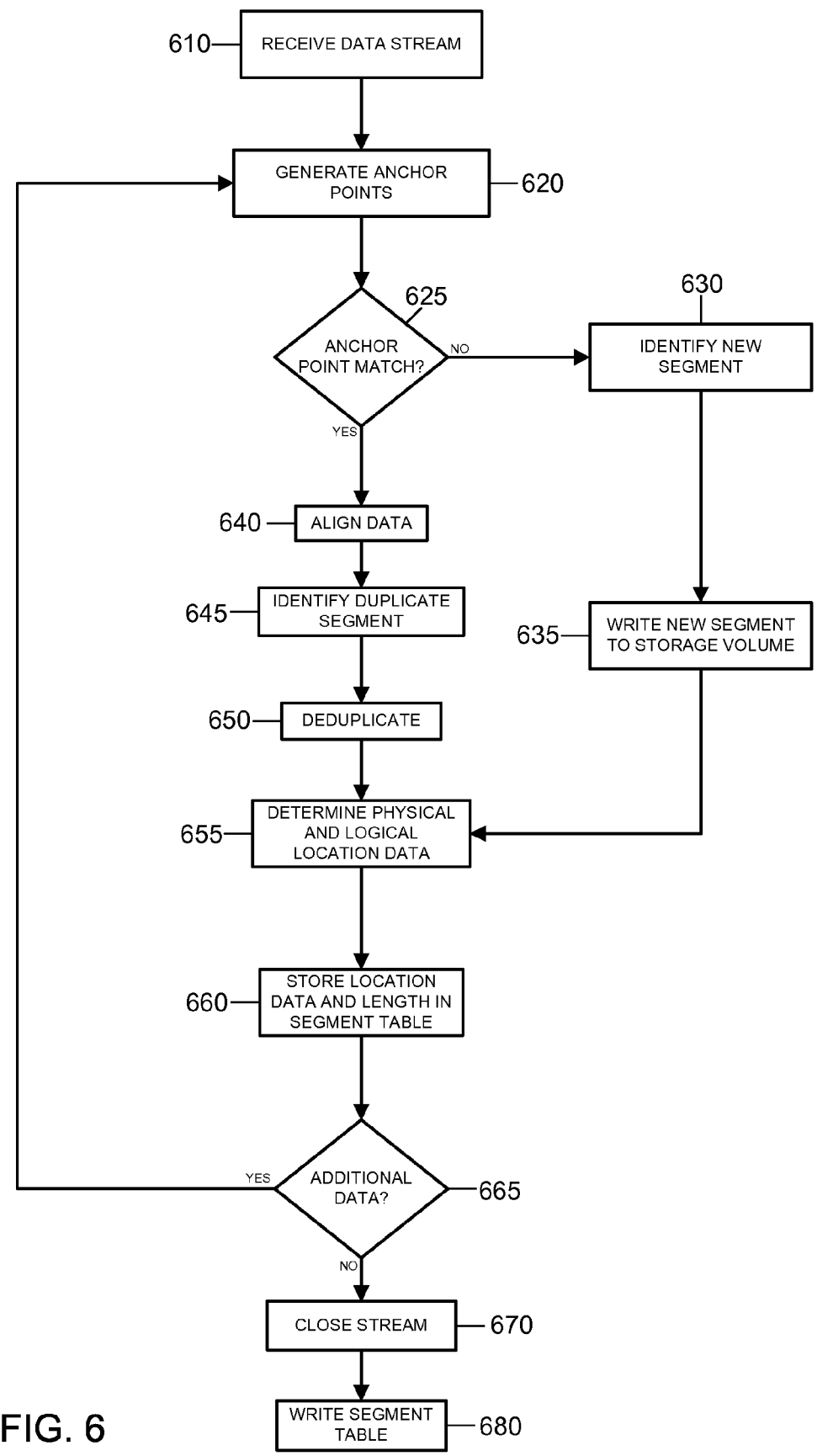
FIG. 6 is a flowchart illustrating a variable length deduplication operation of an embodiment.

FIG. 6 is a flowchart illustrating a variable length deduplication operation of an embodiment. The steps of FIG. 6 are explained in reference to using anchor points to identify duplicate data. However, the steps of FIG. 6 may be performed using any method of identifying duplicate data. Furthermore, the steps are described as being performed by the deduplication engine 334. However, the steps may be performed by any process of the operating system 300, the processor 202 or any hardware component of the server 200, or by an external hardware component or software process.

At step 610, the deduplication engine 334 may receive a backup data stream from the backup engine 332 which is being written to the backup volume 107. The deduplication engine 334 may deduplicate the data as it is received from the backup engine 332. At step 620, the deduplication engine 334 may generate anchor points for data received from the data stream, as discussed above. At step 625, the deduplication engine may determine whether the anchor points exist in the anchor point database 338. If, at step 625, an anchor point exists in the anchor point database 338, the deduplication engine 334 moves to step 640.

At step 640, the deduplication engine 338 aligns the data stream with a boundary, or start, of a stored data block. A deduplication can only be performed on one or more entire data blocks, thus in order to deduplicate the data stream, the data stream may be aligned with the start of a stored data block. The deduplication engine 334 may compare the bytes in the data stream, starting with the bytes corresponding to the generated anchor point, with the stored data blocks, starting at the data block corresponding to the anchor point identified in the anchor point database 338, until a matching byte which corresponds to the start of a data block is found. The deduplication engine 334 may align the data stream at the start of first matching data block. The steps of aligning the data stream may be discussed in more detail in FIG. 7 below.

Once the data stream is aligned with the start of a data block, the deduplication engine 334 moves to step 645. At step 645, the deduplication engine 338 identifies the segment of sequential data in the data stream which is duplicate data. The segment of duplicate data may be identified by performing a byte-by-byte comparison of the data stream and the data blocks stored on the backup volume 107. The segment of duplicate data may end once the bytes of the data stream no longer match an entire stored data block. At step 650, the deduplication engine 334 may deduplicate the segment of duplicate data against the stored data blocks.

If, at step 625, a generated anchor point does not exist in the anchor point database 338, the deduplication engine 334 moves to step 630. At step 630, the deduplication engine 334 identifies the segment of sequential data in the data stream which is new data. The deduplication engine 334 may identify the segment of new data by continuing to generate anchor points until an anchor point is generated which matches an anchor point in the anchor point database 338. The matching anchor point may mark the end of the segment of new data. At step 635, the deduplication engine 334 writes the segment of new data to the backup volume 107.

After storing new a segment of new data or deduplicating a segment of duplicate data, the deduplication engine 334 moves to step 655. At step 655, the deduplication engine 334 determines data describing the physical and logical locations of the segment. The data describing the physical location of the segment may represent the location of the data blocks storing the data contained in the segment, and may be referred to as a physical offset. The data describing the logical location of the segment may represent the location of the segment within the data stream, as it appears to the clients 110A-N, and may be referred to as a logical offset. At step 660, the deduplication engine 334 stores the physical and logical offsets, and the length of the segment in a segment table 339, such that the logical offset and the length can be used to retrieve the data segment from the storage volume 106. The segment table 339 may initially be stored in the memory 204 and may be written to disk once the deduplication operation completes. Alternatively, the deduplication engine 334 may create a segment table 339 for each file which is deduplicated. In this case, once all of the segments of a file have been deduplicated, the deduplication engine 334 may write the segment table 339 to the backup storage volume 107 and associate the segment table 339 to the file as a file attribute.

At step 665, the deduplication engine 334 determines whether additional data can be read from the data stream. If additional data can be read from the data stream, the deduplication engine 334 moves to step 620. At step 620, the deduplication engine 334 generates anchor points for the data read from the data stream and repeats steps 625-665. If, at step 665, the deduplication engine 334 can not read any additional data from the data stream, the deduplication engine 334 moves to step 670.

At step 670, the deduplication engine 334 closes the data stream. At step 680, the deduplication engine 334 writes any segment tables 339 stored in the memory 204 to the backup volume 107. For example, the deduplication engine 334 may maintain one segment table 339 for the entire dataset which may be written to the backup volume 107 as metadata. Alternatively, the segment table 339 may be written to the disks where the backup volume 107 is stored, but outside of the backup volume 107.

Figure 7:
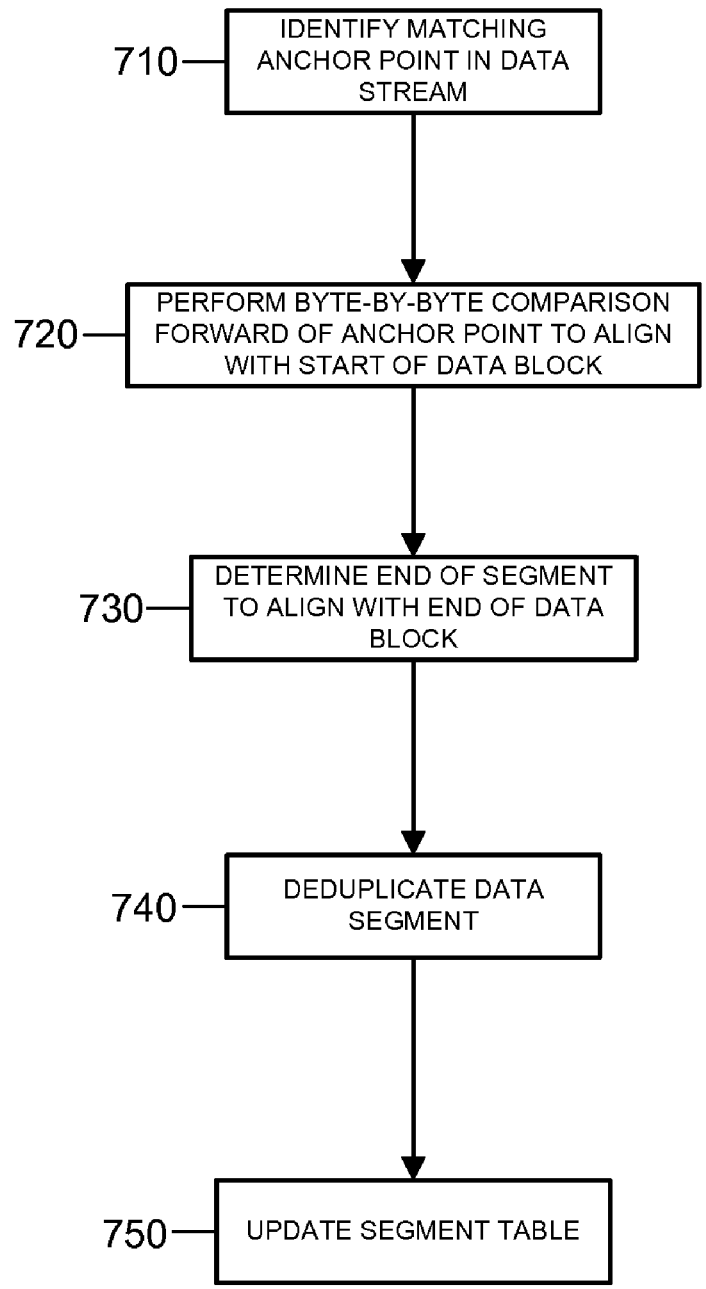
FIG. 7 is a flowchart illustrating an align operation of an embodiment.

FIG. 7 is a flowchart illustrating an align operation of an embodiment. The steps of FIG. 7 are explained in reference to using anchor points to identify duplicate data. However, the steps of FIG. 7 may be performed using any method of identifying duplicate data. Furthermore, the steps are described as being performed by the deduplication engine 334. However, the steps may be performed by any process of the operating system 300, the processor 202 or any hardware component of the server 200, or by an external hardware component or software process.

At step 710, the deduplication engine 334 identifies an anchor point in the data stream which matches an anchor point stored in the anchor point database 338. At step 720, the deduplication engine 334 performs a byte-by-byte comparison of the data stream, starting at the byte corresponding to the anchor point, against the data block on the backup volume 107 corresponding to the anchor point stored in the anchor point database 338. The deduplication engine 334 may compare the bytes in the data stream to identify the first byte which matches the boundary, or start, of a stored data block. Since a deduplication operation may only deduplicate entire data blocks, the bytes from the data stream should be aligned with the start of a stored data block in order to be deduplicated. The first byte which matches the boundary of a stored data block may mark the start of the segment of duplicate data.

At step 730, the deduplication engine 334 determines the end of the segment of duplicate data. The end of the segment of duplicate data is identified by the last matching byte which aligns with the end of a data block. Since data can only be deduplicated against entire stored data blocks, the end of the segment of duplicate data may align with the end of a data block. At step 740, the deduplication engine 334 may deduplicate the segment of duplicate data against the stored data blocks. At step 750, the deduplication engine 334 may enter a row in the segment table 339 which includes the logical offset of the duplicate segment, the physical offset of the duplicate segment and the length of the duplicate segment.

Figure 8:
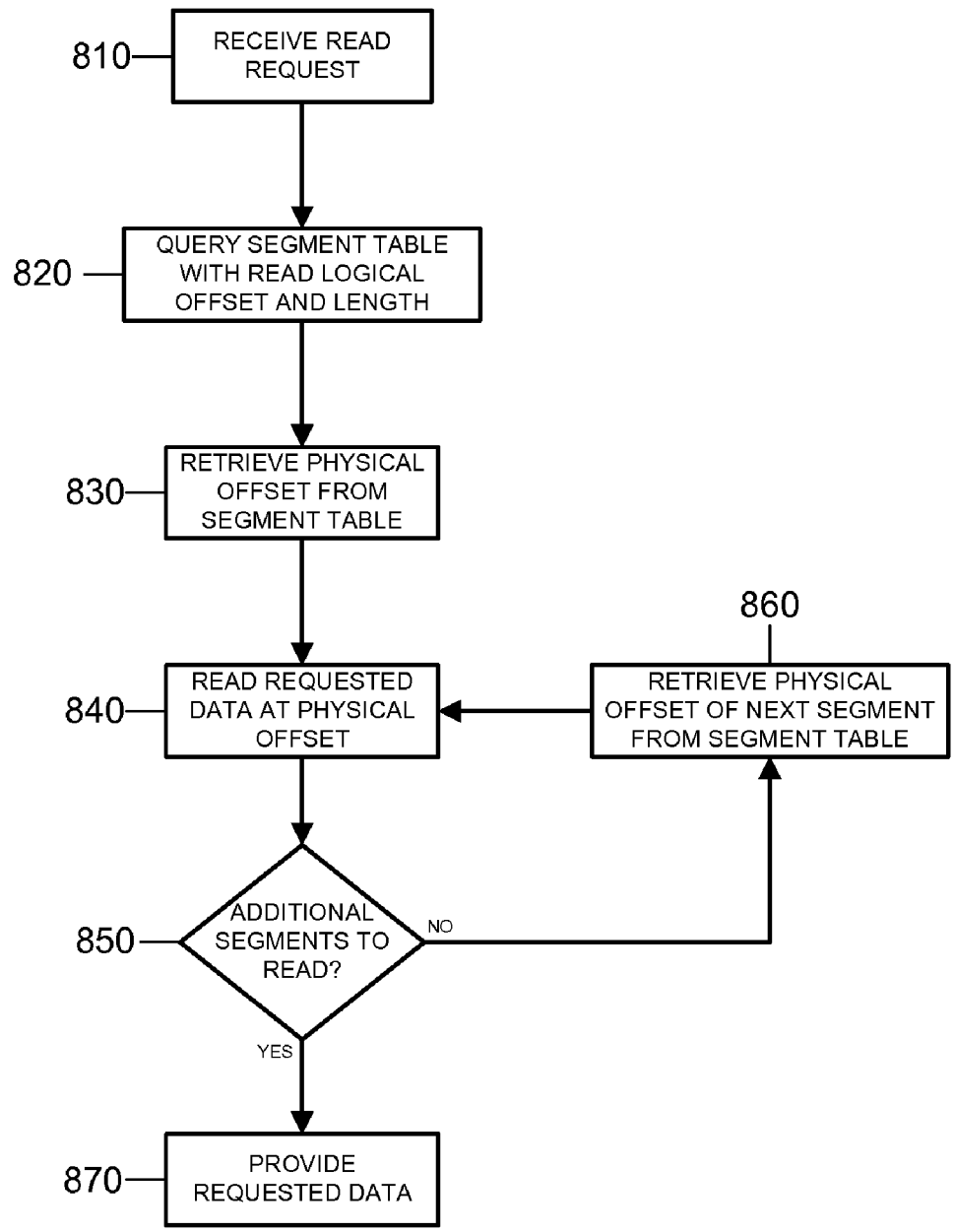
FIG. 8 is a flowchart illustrating a read operation of an embodiment.

FIG. 8 is a flowchart illustrating a read operation of an embodiment. The steps of FIG. 8 are described as being performed by the virtualization engine 318. However, the steps of FIG. 8 may be performed by any process of the operating system 300, the processor 202 or any hardware component of the server 200, or by an external hardware component or software process.

At step 810, the virtualization engine 318 may receive a read request, such as a request from one of the clients 110A-N, to read stored data, such as data stored on the backup volume 107. The read request may include a read length and a logical location data, such as a logical offset, which may describe the first byte of data to be read. At step 820, the virtualization engine 318 queries the segment table 339 for the dataset, or the file being read, with the logical offset and the length of the requested data. At step 830, the virtualization engine 318 retrieves the physical offset and length corresponding to the logical offset from the segment table 339. At step 840, the virtualization engine 318 reads the segment of data stored at the physical offset from the backup storage volume 107.

At step 850, the virtualization later 318 determines whether the data requested spans across additional segments of the segment table 339. For example, if the length of the data requested is larger than the length of data read from the backup storage volume 107, then the requested data may span across additional segments of the segment table 339. If, at step 850, the virtualization engine 318 determines that additional segments need to be read from the segment table 339, the virtualization engine 318 moves to step 860. At step 860, the virtualization engine 318 retrieves the physical offset and length of the next segment from the segment table 339. The virtualization engine 318 then moves to step 840 and repeats the steps 840-850 for the next segment.

If, at step 850, the virtualization engine 318 determines that all of the requested data has been read from the backup volume 107, the virtualization engine 318 moves to step 870. At step 870 the virtualization engine 318 provides the requested data to the requesting client.

Figure 9:
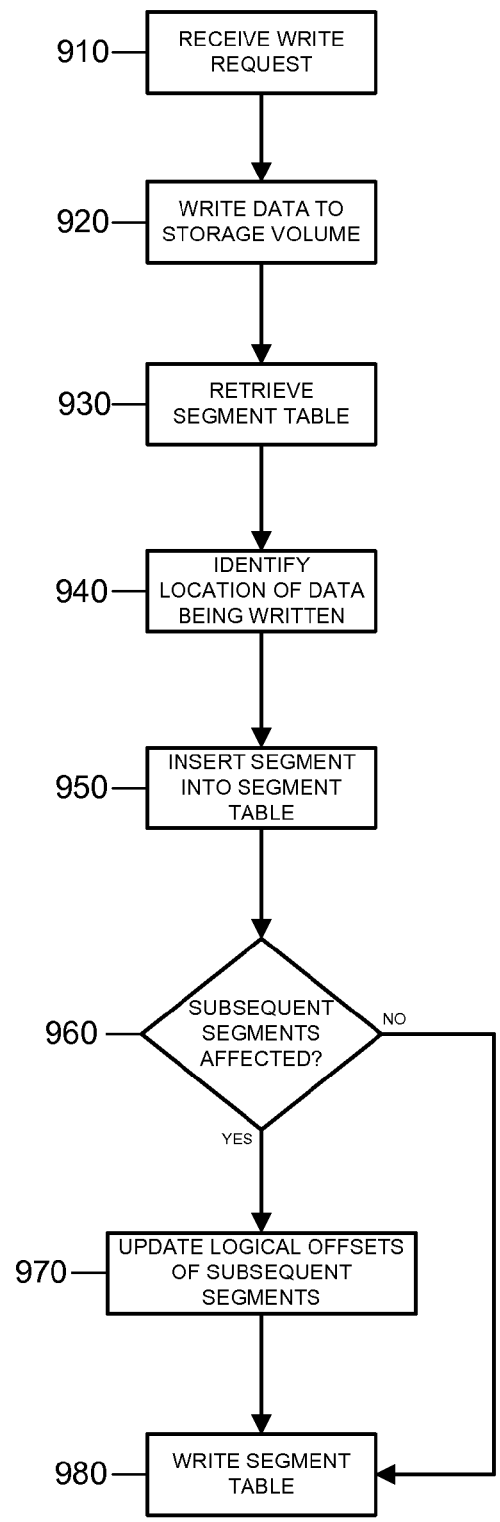
FIG. 9 is a flowchart illustrating a write operation of an embodiment.

FIG. 9 is a flowchart illustrating a write operation of an embodiment. The steps of FIG. 9 are described as being performed by the virtualization engine 318. However, the steps of FIG. 9 may be performed by any process of the operating system 300, the processor 202 or any hardware component of the server 200, or by an external hardware component or software process.

At step 910, the virtualization engine 318 may receive a write request, such as a request from one of the clients 110A-N, to write data, such as to the storage volume 106. The write request may include the data to be written to the storage volume 106 and a logical offset corresponding to the location to write the data. At step 920, the virtualization engine 318 may write the data to the backup volume 107 as new data, without attempting to deduplicate the data. Alternatively, the deduplication engine 334 may attempt to deduplicate the data being written to the backup volume 107.

At step 930, the virtualization engine 318 may retrieve the segment table 339 from the storage volume 106. Alternatively, if a segment table 339 exists for each file in the storage volume 106, the virtualization engine 318 may retrieve the segment table corresponding to the file being written to. At step 940, the virtualization engine 318 may identify the logical location of the data being written in the segment table 339. For example, if new data is being inserted into the middle of the dataset, the virtualization engine 318 may identify the segment the data is being inserted after. At step 950, the virtualization engine 318 may insert a row into the segment table 339 for the new data. The logical offset of the row may correspond to the logical location of the data being written and the physical offset of the row may correspond to the physical location where the data was written to the backup volume 107.

At step 960, the virtualization engine 318 may determine whether subsequent segments of the segment table 339 were affected by the insertion. For example, if the new segment was not inserted at the end of the segment table 339, then subsequent segments of the segment table 339 may have been affected by the insertion. If, at step 960, the virtualization engine 318 determines that subsequent segments were affected by the insertion, the virtualization engine 318 moves to step 970. At step 970, the virtualization engine 318 updates the logical offsets of subsequent segments in the segment table 339 to account for the new segment inserted into the segment table 339. For example, if the new segment was 4 KB, then the logical offsets of the subsequent segments may each need to be shifted by 4 KB. However, the physical offsets of the segments remain unchanged, because the corresponding physical locations of the data on the backup volume 107 have not changed.

If, at step 960, the virtualization engine 318 determines that subsequent segments were not affected by the insertion, the virtualization engine 318 moves to step 980. At step 980, the virtualization engine 318 writes the updated segment table 339 to the backup volume 107.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for providing variable length duplication of a data stream on a fixed block file system, the method comprising:
   receiving, by a processor, a data stream, wherein the data stream comprises of a plurality of data items;
   determining, by the processor, whether a first segment of data items of the plurality of data items exists on a storage volume;
   storing, by the processor, the first segment of data items on the storage volume if the first segment of data items does not exist on the storage volume, otherwise deduplicating the first segment of data items with the storage volume; and
   storing, by the processor in a data structure, an association between a logical identifier describing a location of the first segment of data items in the data stream, a physical identifier describing a physical location of the first segment of data items on the storage volume, and a length of the first segment of data items, wherein the first segment of data items can be retrieved from the storage volume using the logical identifier and the length, wherein a data item can be retrieved from the storage volume using a read request comprising a read logical offset and a read length.

2. The computer-implemented method of claim 1 wherein determining, by the processor, whether a first segment of data items of the plurality of data items exists on a storage volume further comprises:
   generating, by the processor, a plurality of anchor points corresponding to the first segment of data items, wherein the plurality of anchor points are generated by inputting the first segment of data items to a rolling hash function; and
   determining, by the processor, whether at least one anchor point in the plurality of anchor points exists in an anchor point database.

3. The computer-implemented method of claim 1 wherein the logical identifier comprises of a logical offset which indicates the location of the first segment of data items in the data stream.

4. The computer-implemented method of claim 3 wherein the physical location identifier comprises of a physical offset of a start of the first segment of data items in on the storage volume.

5. The computer-implemented method of claim 4 further comprising:
   receiving, via the processor the read request;
   retrieving, by the processor from the data structure, a read physical offset associated with the read logical offset; and
   providing, by the processor, the data item stored on the storage volume, wherein a location of the data on the storage volume is identified by the read length and the read physical offset.

6. The computer-implemented method of claim 1 further comprising:
   receiving, by the processor, a close request associated with the data stream;
   closing, by the processor, the data stream; and
   writing, by the processor, the data structure to the storage volume.

7. The computer-implemented method of claim 1 wherein the storage volume utilizes a fixed block length file system.

8. The computer-implemented method of claim 7 wherein the first segment of data items is stored across a plurality of data blocks on the storage volume.

9. The computer-implemented method of claim 8 wherein the first segment of data items is aligned with a boundary of a data block on the storage volume before deduplicating the first segment of data items.

10. The computer-implemented method of claim 1 further comprising:
    determining, by the processor, whether a second segment of data items of the plurality of data items exists on the storage volume, wherein the second segment of data items is a different length than the first segment of data items.

11. The computer-implemented method of claim 1 wherein the data stream is received from a backup operation.

12. The computer-implemented method of claim 1 wherein the data stream is read from a storage device.

13. A computer-implemented method for removing duplicate data from a data stream prior to storing the data on a storage volume utilizing fixed length data blocks, the method comprising:
    receiving, by a processor, a data stream comprising of a plurality of data items, wherein the plurality of data items collectively comprises a backup dataset;
    identifying, by the processor, as the data items are received, a first segment of the data items, wherein the first segment of data items also exists on a storage volume;
    aligning, by the processor, the first segment of data items with a boundary of a data block on the storage volume such that the data block stores the first data item in the segment of data items;
    deduplicating, by the processor, the first segment of data items with the storage volume starting at the boundary of the data block;
    determining, by the processor, a first length and a first physical offset of the first segment of data items, the first physical offset and first length representing a location of the first segment of data items on the storage volume;
    determining, by the processor, a first logical offset of the first segment of the data items, the first logical offset and first length representing a location of the first segment of data items within the backup dataset;
    storing, in a data structure, an association between the first length, the first physical offset and the first logical offset such that the first segment of data items can be retrieved from the storage volume using the first logical offset and first length, wherein a data item can be retrieved from the storage volume using a read request comprising a read logical offset and a read length.

14. The computer-implemented method of claim 13, further comprising:

identifying, by the processor, a second segment of data items, wherein the second segment of data items does not exist on the storage volume;

storing the second segment of data items on the storage volume; determining a second physical offset and a second length of the second segment of data items, the second physical offset representing a location of the second segment of data items on the storage volume; wherein the second length is not equal to the first length;

determining, by the processor, a second logical offset of the second segment of data items, the second logical offset and the second length representing a location of the second segment of data items within the data stream; and storing, in the data structure, the second length, the second physical offset and the second logical offset, such that the second segment of data items can be retrieved from the storage volume using the second logical offset and the second length.

15. The computer-implemented method of claim 13 wherein the first physical offset points to the boundary of the data block on the storage volume.

16. The computer-implemented method of claim 13 further comprising:

receiving, by the processor, the read request;

retrieving, by the processor from the data structure, a read physical offset associated with the read logical offset; and providing, by the processor, the data item stored on the storage volume, wherein a location of the data on the storage volume is identified by the read length and the read physical offset.

17. The computer-implemented method of claim 13 further comprising:

receiving, by the processor, a close request associated with the data stream;

closing, by the processor, the data stream; and writing, by the processor, the data structure on the storage volume.

18. The computer-implemented method of claim 13 wherein the storage volume utilizes a fixed block length file system.

19. The computer-implemented method of claim 18 wherein the first segment of data items is stored across plurality of data blocks on the storage volume.

20. The computer-implemented method of claim 13 wherein the data stream is received from a backup operation.

21. The computer-implemented method of claim 13 wherein the data stream is read from a storage device.

22. A system for providing variable length duplication on a fixed block file system, the system comprising:

a storage volume operative to store a plurality of datasets;

a memory operative to store a data structure; and a processor operatively connected to the storage volume and the memory and operative to:

receive a data stream, wherein the data stream comprises of the plurality of data items;

determine whether a segment of data items of the plurality of data items exists on the storage volume;

store the segment of data items on the storage volume if the segment of data items does not exist on the storage volume, otherwise deduplicate the segment of data items with the storage volume; and store, in the data structure, an association between a logical identifier describing a location of the segment of data items within the data stream, a physical identifier describing a physical location of the segment of data items on the storage volume, and a length of the segment of data items, wherein the segment of data items can be retrieved from the storage volume using the logical identifier and the length, wherein a data item can be retrieved from the storage volume using a read request comprising a read logical offset and a read length.

23. The system of claim 22 wherein the logical identifier comprises of a logical offset which indicates the location of the segment of data items in the data stream.

24. The system of claim 22 wherein the physical location identifier comprises of a physical offset which indicates the physical location of the segment of data items on the storage volume.

25. The system of claim 22 wherein the processor is further operative to:

receive the read request;

retrieve, from the data structure, a read physical offset associated with the read logical offset; and provide the data item stored on the storage volume, wherein a location of the data on the storage volume is identified by the read length and the read physical offset.

26. The system of claim 22 wherein the processor is further operative to:

receive a close request associated with the data stream;

close the data stream; and store the data structure on the storage volume.

27. The system of claim 22 wherein the storage volume utilizes a fixed block length file system.

28. The system of claim 27 wherein the segment of data items are stored across a plurality of data blocks on the storage volume.

29. The system of claim 28 wherein the processor is further operative to:

align the segment of data items with a boundary of a data block stored on the storage volume.

30. The system of claim 22 wherein the data stream is received from a backup operation.

31. The system of claim 22 wherein the data stream is read from a storage device.

\* \* \* \* \*